United States Patent [19]

Orii et al.

[11] Patent Number: 4,961,037
[45] Date of Patent: Oct. 2, 1990

[54] STEPPING MOTOR CONTROL DEVICE

[75] Inventors: Akira Orii; Hiroyuki Morita, both of Tokyo, Japan

[73] Assignee: Janome Sewing Machine Industry Co., Ltd., Tokyo, Japan

[21] Appl. No.: 328,467

[22] Filed: Mar. 24, 1989

[30] Foreign Application Priority Data

Mar. 25, 1988 [JP] Japan .................................. 63-69291

[51] Int. Cl.$^5$ .............................................. H02P 8/00
[52] U.S. Cl. ...................................... 318/696; 318/685
[58] Field of Search ................................. 318/696, 685

[56] References Cited

U.S. PATENT DOCUMENTS 4,678,979  7/1987  Hori .................................... 318/696
4,734,632  3/1988  Kamikura ............................ 318/685

Primary Examiner—William M. Shoop, Jr.
Assistant Examiner—Saul M. Bergmann
Attorney, Agent, or Firm—Dann, Dorfman, Herrell and Skillman

[57] ABSTRACT

A current to be fed to a stepping motor for driving is determined by an operating circuit to which are input digital values converted from analog values representing various factors which may affect the stepping motor driving current. The results output from the operating circuit are sent to counters operated in response to a clock pulse signal supplied from an oscillator to thereby generate a pulse-width-modulation (PWM) signal to a stepping motor driving circuit through an output control circuit. The stepping motor driving current may be controlled in dependence on the values of PWL and PWH of the PWM signal.

3 Claims, 5 Drawing Sheets

PWL: OUTPUT VALUE OF FIRST COUNTER
PWH: OUTPUT VALUE OF SECOND COUNTER

STEPPING MOTOR CONTROL DEVICE

BACKGROUND OF THE INVENTION

This invention relates to a control device for controlling operation of a stepping motor.

Various types of stepping motors or pulse motors have been widely utilized in connection with electronic appliances. For example, a stepping motor is mounted in an electronic sewing machine for incremental feed of a fabric to be sewn. The stepping motor is driven in response to stitch control data which are in advance stored in a memory for each stitch of a stitch pattern.

A control device has thus been used for controlling operation of a stepping motor which typically involves a circuit shown in a block diagram of FIG. 1. A current at A—$\overline{\text{A}}$ phase of the stepping motor is detected by a resistor $R_1$ whereas a current at B—$\overline{\text{B}}$ phase is detected by another resistor $R_2$, the results of which being input to first and second comparators 10 and 11 respectively for comparison with reference voltage Vref. The comparative results obtained at the first and second comparators 20, 21 are alternately and sequentially output to a stepping motor drive circuit 23 in synchronism with a clock signal generated from a trigger pulse oscillator 22. Thus, the stepping motor has to be driven by a constant current.

With the conventional control device, however, torque characteristics of the stepping motor would be varied by variation of voltages $V_{a1}$, $V_{a2}$ for driving the stepping motor as shown in FIG. 2(a). Such variation of the driving voltages $V_{a1}$, $V_{a2}$ would be caused by, for example, a voltage variation in a line supply (which may be varied in the order of ±10%) and a voltage variation in a transformer (in the order of ±5%). The torque characteristics of the stepping motor would also be varied by variation of winding currents $I_1$, $I_2$ of the stepping motor, as shown in FIG. 2(b), resulting from factors residing in the control device, for example, inherent errors in design of resistance values of potential dividing resistors (in the order of ±7%) for providing the reference voltage Vref, as well as the current detecting resistors $R_1$, $R_2$ (in the order of ±2%). Moreover, the load of the stepping motor would undergo a change by an error in accuracy of assembled components and variations of circumferential temperatures.

By virtue of these variation factors, a current to be fed to the stepping motor should have been determined to be considerably higher than a theoretical value so that the stepping motor could surely be driven even under the worst conditions. This would require a large mass of electric power to be supplied to the stepping motor and often overheat the stepping motor.

SUMMARY OF THE INVENTION

It is therefore an object of this invention to provide a novel device for controlling a stepping motor capable of eliminating disadvantages of the prior art device.

Another object of this invention is to provide a stepping motor controlling device which ensures that the stepping motor be at all times driven with a current of an optimum value and optimum torque characteristics.

According to an aspect of this invention there is provided a stepping motor control device used in connection with a stepping motor driving circuit for controlling driving conditions of a stepping motor, comprising resistor means for detecting current values of windings of the stepping motor; an analog/digital converter for converting analog values into digital values, said analog values including first voltage values corresponding to the current values generated at said resistor means and a second voltage value supplied to the stepping motor driving circuit for driving the stepping motor; means for calculating a current value to be fed to the stepping motor driving circuit based on the digital values obtained at said analog/digital converter; first and second counters operated in response to the results obtained at said calculating means; an output control circuit adapted to be operated in response to outputs from said first and second counters to generate a pulse-width-modulation signal; and an oscillator for supplying a clock signal to said first and second counters.

Further objects and advantages of this invention can be fully understood from the following detailed description when read in conjunction with the accompanying drawings in which.

DESCRIPTION OF PREFERRED EMBODIMENTS

Figure 1:
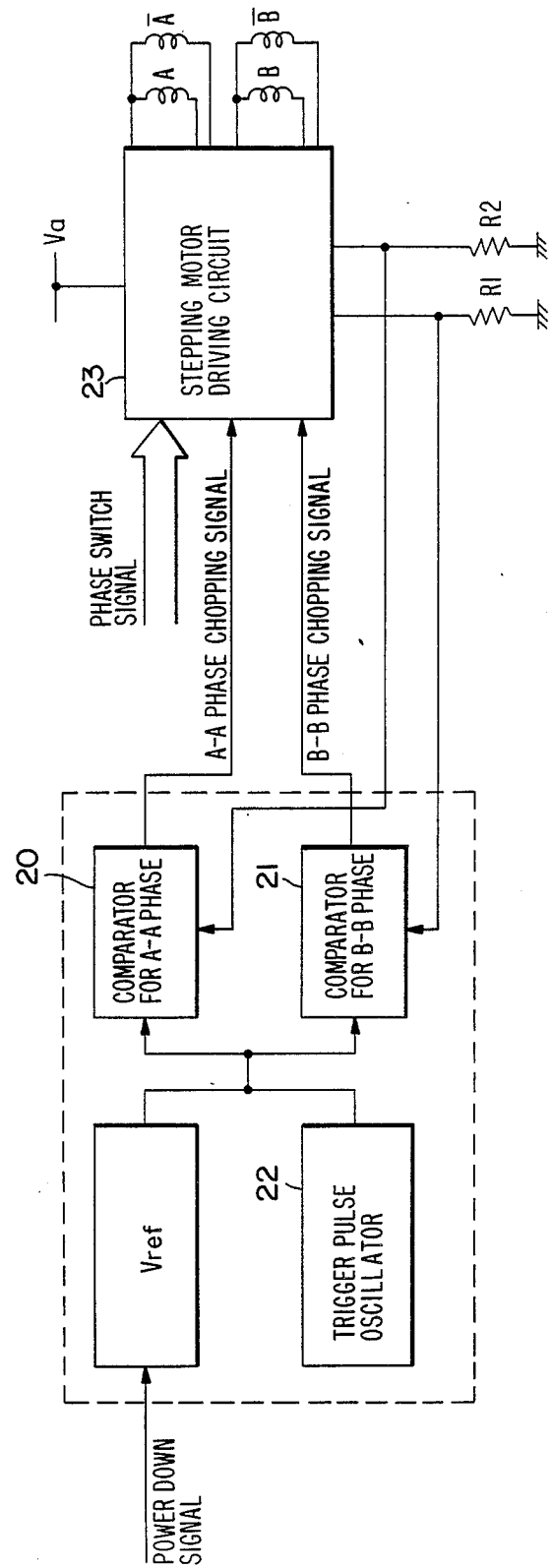
FIG. 1 is a block diagram showing a typical circuit construction of a conventional control device for a stepping motor.
Figure 2A:
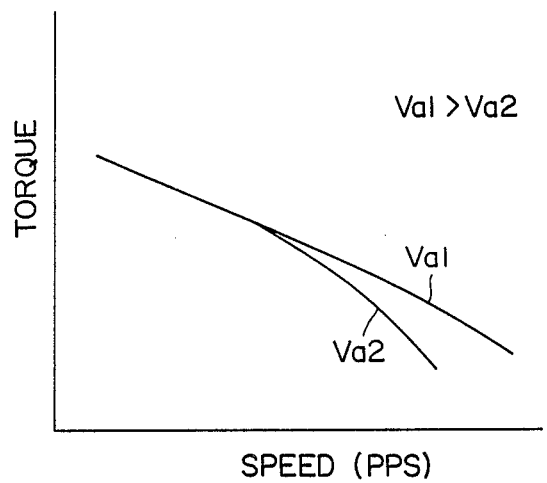
FIG. 2(a) is a graph showing relation between a torque and speed of a stepping motor controlled by the conventional control device, which is varied by variation of a driving voltage.
Figure 2B:
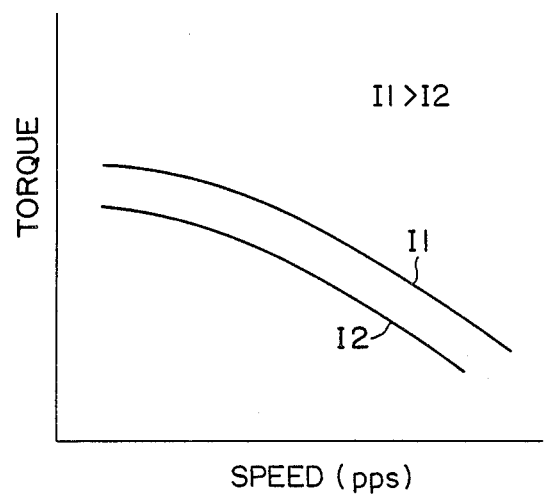
FIG. 2(b) is a graph showing relation between a torque and speed of a stepping motor controlled by the conventional control device, which is varied by variation of a winding current.
Figure 3:
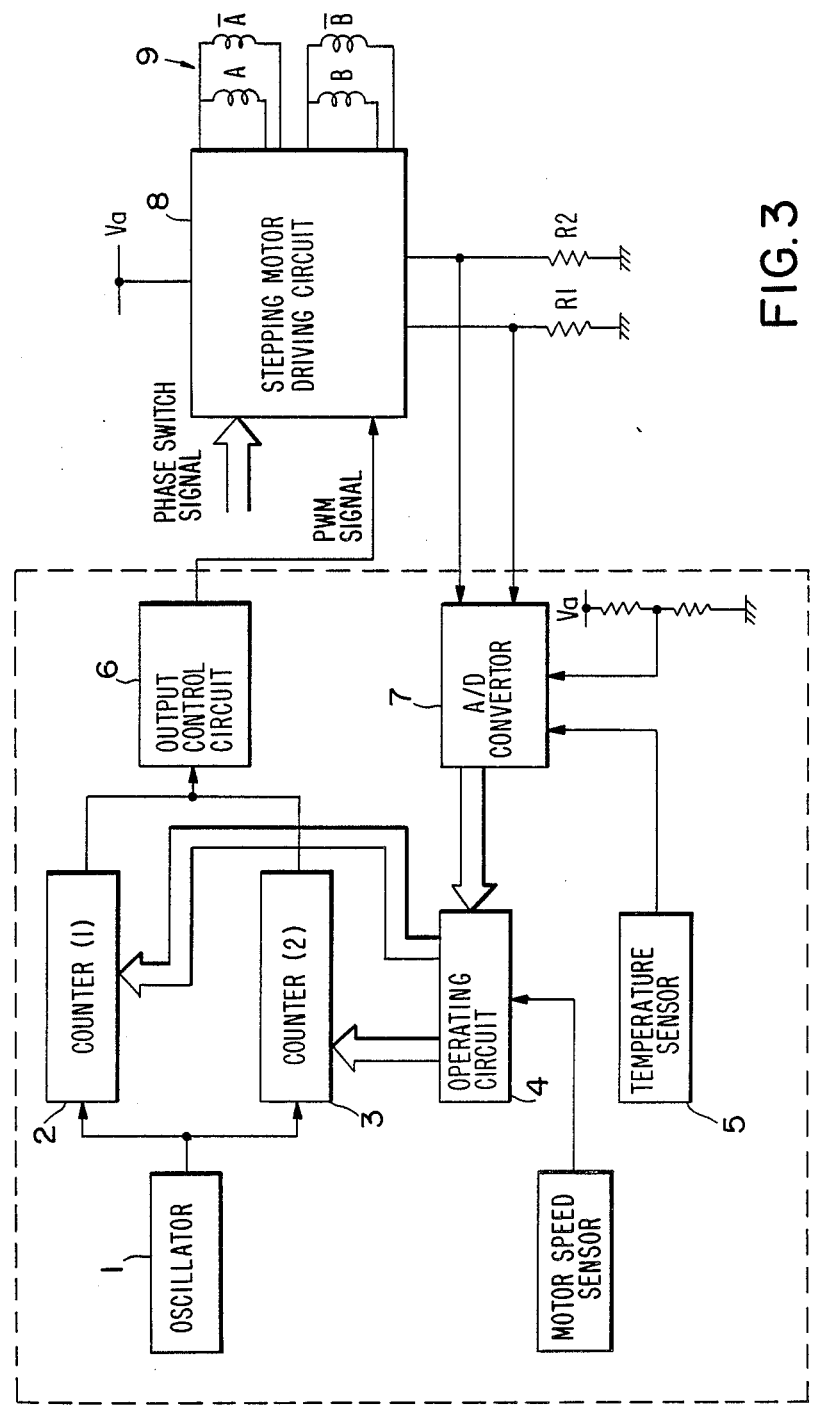
FIG. 3 is a block diagram showing a circuit construction of a control device in accordance with this invention.
Figure 4:
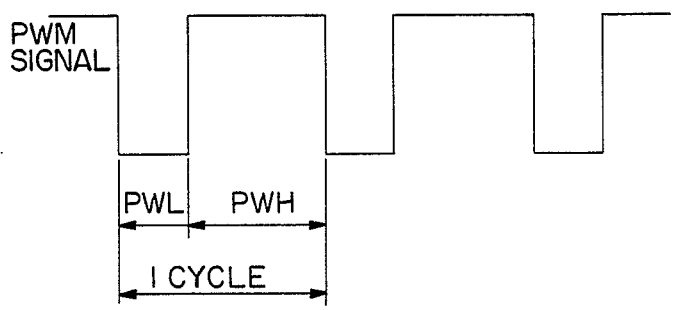
FIG. 4 is a time chart of an example of a pulse width modulation signal output from the control device of this invention.

Reference should now be made to FIG. 3 illustrating a circuitry of a stepping motor control device embodying the invention, which is mounted in an electronic sewing machine for incremental feed of a fabric. As in the prior art, A—$\overline{\text{A}}$ phase current and B—$\overline{\text{B}}$ phase current of a stepping motor 9 are respectively detected by resistors $R_1$ and $R_2$ as corresponding voltage values. The voltage values are input to an analog/digital convertor 7. Another voltage value corresponding to a stepping motor driving voltage Va is also input to A/D converter 7. Still another voltage value is generated from a temperature sensor which is itself known in the art for detecting a circumferential temperature and given to A/D converter 7. These analog values are converted to digital values by A/D converter 7 which are then output to an operating circuit 4. The operating circuit 4 has preset reference values used for comparison with the stepping motor winding currents, the stepping motor driving voltage Va and the circumferential temperature and is operated based on the input digital values to calculate a current of an optimum value to be fed to a stepping motor driving circuit 8. The results of calculation at the operation circuit 4 are set to first and second counters 2 and 3. The counters 2, 3 are operated in response to a clock signal output from an oscillator 1 to start counting. The counts at the counters 2, 3 are supplied to an output control circuit 6 which generates a pulse-width-modulation (PWM) signal such as that shown in FIG. 4 to the stepping motor driving circuit 8. As seen in FIG. 4 a cycle of a constant PWM signal is made up of a pulse width of low level (PWL) output from the first counter 2 and a pulse width of high level (PWH) output from the second counter 3 as determined by operating circuit 4. The stepping motor driving circuit 8 is operated in response to a phase switch signal, which is supplied from a central processing unit (not shown) of the sewing machine, to apply the driving voltage Va to a selective one of windings of the stepping motor, and is also operated in response to PWM signal from the output control circuit 6 to control the current value of the stepping motor winding being now selected to be applied the driving voltage Va.

With the afore-mentioned construction, for example, when the stepping motor driving voltage Va has a value higher than a predetermined reference value, PWL which is determined in correspondence to the output value of the first counter 2 is made smaller than PWH determined by the output value of the second counter 3, as illustrated in FIG. 4 to thereby lower the driving voltage Va. When, on the contrary, the stepping motor driving voltage Va is lower than the reference value, PWL is made larger and PWH smaller.

Figure 6:
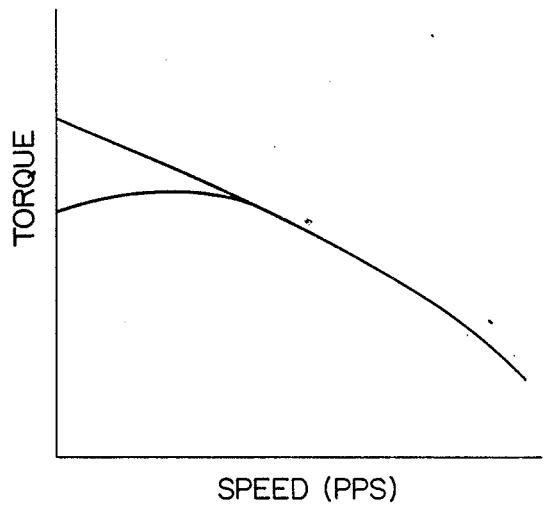
FIG. 6 is a graph showing relationship between a torque and speed of a stepping motor controlled by the device according to this invention.

In accordance with the construction of the embodiment, speed of the stepping motor 9 may further be taken into consideration in determining the optimum current value. More particularly, a switch timing of the phase switch signal is controlled by CPU of the sewing machine for determining the motor speed. Data with regard to the motor speed is sent from CPU to the operation circuit 4 as a parameter for determination of the optimum current value. Thus, as shown in FIG. 6, the load torque can be desirably determined in relation to the speed.

Inaccuracy of the load can also be considered as another parameter for the optimum current value which is determined at the operation circuit 4. This can be detected by, when initializing, gradually increasing the current supplied to the stepping motor 9 to find a torque value required for operation of the instruments and appliances involved. Suppose that the motor starts rotating when the current reaches 0.4A, this current value representing the torque is stored in the operation circuit 4 as a compensation parameter.

Figure 5:
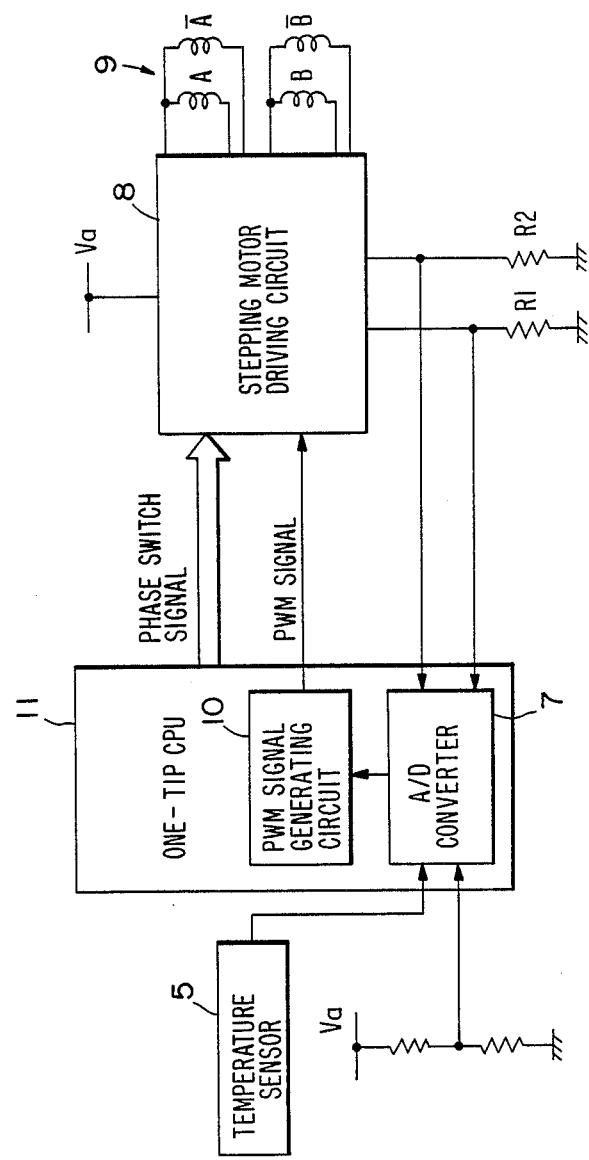
FIG. 5 is a block diagram showing another embodiment of this invention.

FIG. 5 shows a modification of the embodiment shown in FIG. 3 wherein operation of the oscillator 1, counters 2 and 3, operation circuit 4 and output control circuit 6 are achieved in a single unit, a PWM signal generating circuit 10. The PWM signal generating circuit 10 and an A/D converter 7 are constituted by a one tip CPU 11. It will be seen that the operation and function of this modification is the same as in the first embodiment.

With the invention having construction as described above in detail, since various affecting factors have been incorporated into the operation circuit, the stepping motor can be driven with the optimum current value and torque characteristics. There will only remain errors in the order of ±2% in accuracy of the resistance values of the current detecting resistors $R_1$, $R_2$, which would not bring a serious influence to the driving current.

While the invention has been described in several embodiments thereof, it is to be understood that this invention is not limited thereto and many modifications and variations may be made without departing from spirit and scope of the invention as defined in the appended claims.

What is claimed is:

1. A stepping motor control device used in connection with a stepping motor driving circuit for controlling driving conditions of a stepping motor, comprising resistor means for detecting current values of windings of the stepping motor; an analog/digital converter for converting analog values into digital values, said analog values including first voltage values corresponding to the current values generated at said resistor means and a second voltage value supplied to the stepping motor driving circuit for driving the stepping motor; means for calculating a current value to be fed to the stepping motor driving circuit based on the digital values obtained at said analog/digital converter; first and second counters operated in response to the results obtained at said calculating means; an output control circuit adapted to be operated in response to outputs from said first and second counters to generate a pulse-width-modulation signal and an oscillator for supplying a clock signal to said first and second counters.

2. The stepping motor control device according to claim 1 which further comprises a temperature sensor for detecting a circumferential temperature and generating a voltage output corresponding to the circumferential temperature thus detected, said voltage output being also supplied to said analog/digital convertor for conversion into said digital values.

3. The stepping motor control device according to claim 1 wherein data regarding speed of the stepping motor is input to said calculating means as a supplemental parameter in determination of the current value.

* * * * *